(12) United States Patent
Yun

(10) Patent No.: US 12,236,187 B2
(45) Date of Patent: Feb. 25, 2025

(54) METHOD FOR AUTOMATICALLY CREATING USER-CUSTOMIZED DOCUMENT, AND DEVICE AND SERVER FOR SAME

(71) Applicant: WERT INTELLIGENCE CO., LTD., Seoul (KR)

(72) Inventor: Jung-Ho Yun, Seoul (KR)

(73) Assignee: WERT INTELLIGENCE CO., LTD., Seoul (KR)

( * ) Notice: Subject to any disclaimer, the term of this patent is extended or adjusted under 35 U.S.C. 154(b) by 0 days.

(21) Appl. No.: 17/640,236

(22) PCT Filed: Sep. 3, 2020

(86) PCT No.: PCT/KR2020/011897
§ 371 (c)(1),
(2) Date: Mar. 3, 2022

(87) PCT Pub. No.: WO2021/045547
PCT Pub. Date: Mar. 11, 2021

(65) Prior Publication Data
US 2022/0269854 A1 Aug. 25, 2022

(30) Foreign Application Priority Data
Sep. 4, 2019 (KR) .................... 10-2019-0109549

(51) Int. Cl.
*G06F 40/186* (2020.01)
*G06F 40/103* (2020.01)
*G06F 40/174* (2020.01)

(52) U.S. Cl.
CPC .......... *G06F 40/186* (2020.01); *G06F 40/103* (2020.01); *G06F 40/174* (2020.01)

(58) Field of Classification Search
CPC ..... G06F 40/186; G06F 40/103; G06F 40/174
See application file for complete search history.

(56) References Cited

U.S. PATENT DOCUMENTS

2003/0093497 A1* 5/2003 Ohashi .................. G06F 40/166
709/217
2009/0113289 A1 4/2009 Zhang et al.
(Continued)

FOREIGN PATENT DOCUMENTS

JP 2003-345783 A 12/2003
JP 4536127 B2 9/2010
(Continued)

OTHER PUBLICATIONS

International Search Report for PCT/KR2020/011897 dated Nov. 30, 2020 [PCT/ISA/210].
(Continued)

*Primary Examiner* — Kyle R Stork
(74) *Attorney, Agent, or Firm* — Sughrue Mion, PLLC

(57) ABSTRACT

Provided is a method for automatically creating a user-customized document, and the method includes: receiving an automatic document creation target from a user, wherein the automatic document creation object comprises a plurality of data items and a plurality of tags matching the plurality of data items is defined; receiving, from the user, a template file in which a format of the user-customized document is set, wherein the template file comprises at least one tag; and generating the user-customized document by replacing each tag in the template file with a data item matching a corresponding tag in the automatic document creation target.

14 Claims, 10 Drawing Sheets

(56) References Cited

U.S. PATENT DOCUMENTS

| | | | | |
|---|---|---|---|---|
| 2010/0217717 | A1* | 8/2010 | Overby | G06Q 10/00 |
| | | | | 715/764 |
| 2011/0246867 | A1* | 10/2011 | Tsutsumi | G06F 40/174 |
| | | | | 715/222 |
| 2014/0089782 | A1* | 3/2014 | Cook | G06F 16/957 |
| | | | | 715/234 |
| 2015/0117721 | A1* | 4/2015 | Rhodes | G06Q 10/06 |
| | | | | 382/112 |
| 2016/0092591 | A1* | 3/2016 | Barouni Ebrahimi | |
| | | | | G06F 16/2255 |
| | | | | 707/709 |
| 2018/0129637 | A1* | 5/2018 | Lantwin | G06F 40/131 |
| 2018/0276184 | A1 | 9/2018 | Krishna | |
| 2019/0113289 | A1* | 4/2019 | Lin | F28D 15/0283 |
| 2020/0293164 | A1* | 9/2020 | Lee | G06F 40/14 |
| 2020/0334249 | A1* | 10/2020 | Canim | G06F 16/2458 |

FOREIGN PATENT DOCUMENTS

| | | | | |
|---|---|---|---|---|
| KR | 10-1569112 B1 | 11/2015 | | |
| WO | WO2019/193407 | * 10/2019 | | G06F 17/30 |

OTHER PUBLICATIONS

Written Opinion for PCT/KR2020/011897 dated Nov. 30, 2020 [PCT/ISA/237].

* cited by examiner

FIG. 2

| Data Item Name | Tag Name | Usage Type |
|---|---|---|
| Number | #NO# | common |
| Name of Invention | #name# | common |
| Nationality | #nationality# | common |
| Document Type | #document type# | common |
| Main IPC | #Main IPC# | common |
| Legal Status | #legal status# | common |
| Similarity | #similarity# | common |
| My Grade | #my grade# | common |
| Technical Theme | #technical theme# | common |
| Publication Number | #publication number# | common |
| Registration Number | #registration number# | common |

FIG. 3

| #NO# | Name of Invention | | #name# | |
|---|---|---|---|---|
| ☐ Bibliographic Data | | | | |
| Country Code | #country# | Document Type Code | | #Document Type# |
| Publication /Registration No | #patent number# | Applicant | | #applicant# |
| Legal Status | #status# | Technical Theme | | #technical theme# |
| Main IPC | #MIPC# | Patent Valuation Grade | | #valuation grade# |
| Number of Family Countries | #Number of Family Countries# | Family Country | | #family country# |
| Number of Family Documents | #Number of Family # | Number of Documents per Family Countries | | #number of family countries# |
| Number of Citations | #number of citations# | Number of Cited Documents | | #number of cited documents# |
| ☐ Gist of Patent | | | | |
| Abstract | #abstract# | | | |
| Representative Claim | #representative claim# | | | |
| Drawing | | #representative drawing# | | |
| LINK | | #LINK# | | |
| | | ☐ Reviewer's comment | | |

310

| | Name Of the Invention | | |
|---|---|---|---|
| 1 | Code Reuse Weakness Scanning Diagnostic Apparatus and Method | | |
| ☐ Bibliographic Data | | | |
| Country Code | KR | Document Type Code | B1 |
| Registration Number | KR 2028251 B1 | Applicant | SEOUL WOMENS UNIVERSITY INDUS |
| Legal Status | Registered | Technical Theme | None |
| Main IPC | G06F-021/57 | Patent Valuation Grade | N |
| Number of Family Countries | 1 | Family Country | KR |
| Number of Family Patent Documents | 2 | Number of Documents per Family Country | KR(2) |
| Number of Citation | 3 | Number of Cited Documents | - |
| ☐ Gist of Patent | | | |
| Abstract | The present invention relates to a code reuse vulnerability scanning diagnostic device, which may include a control unit that generates a scan packet and determines whether a target device is vulnerable; a storage unit that stores the scan packet generated by the control unit and stores the result of the control unit determining whether the target device is vulnerable; and a communication unit that exchanges data with the target device. | | |
| Representative Claim | A code reuse vulnerability scanning diagnostic device comprising: a control unit that generates a preset number of scan packets and determines whether the target device is vulnerable to a code reuse attack; a storage unit that stores the scan packets generated by the control unit and stores the result of determining whether the target device is vulnerable by the control unit; and a communication unit that transmits scan packets to the target device and receives a response packet from the target device in response to the transmission of the scan packet; wherein each generated scan packet includes a sequence of gadget addresses having different lengths. | | |
| Drawing | | | |
| LINK | https://www.keywert.com/detail?countryEnum=1&documentId=kr20170135172b1 | | |
| ☐ Reviewer's Comment | | | |

FIG. 4

| | Name of the Invention | | |
|---|---|---|---|
| #NO# | #name# | | |
| ☐ Bibliographic Data | | | |
| Country Code | #country# | Document Type Code | #Document Type# |
| Publication / Registration No | #patent number# | Applicant | #applicant# |
| Legal Status | #status# | Technical Theme | #technical theme# |
| Main IPC | #MIPC# | Patent Valuation Grade | #valuation grade# |
| Number of Family Countries | #Number of Family Countries# | Family Country | #family country# |
| Number of Family Documents | #Number of Family # | Number of Documents per Family Country | #number of family countries# |
| Number of Citations | #number of citations# | Number of Cited Documents | #number of cited documents# |

⇒

| | Name of the Invention | | |
|---|---|---|---|
| | Exhaust gas after-treatment device for vehicle | | |
| ☐ Bibliographic Data | | | |
| Country Code | KR | Document Type Code | B1 |
| Publication / Registration No | KR1294061 B1 | Applicant | HYUNDAI MOTOR COMPANY |
| Legal Status | registered | Technical Theme | automobile |
| Main IPC | F01N-003/035 | Patent Valuation Grade | C |
| Number of Family Countries | 1 | Family Country | KR |
| Number of Family Documents | 2 | Number of Documents per Family Country | KR(2) |
| Number of Citations | 3 | Number of Cited Documents | 3 |

| No | Country | Type | Main IPC | No. | Application No. | Name of the Invention | Applicant |
|---|---|---|---|---|---|---|---|
| 1 | KR | B1 | G-06F-021/56 | 1989580 | 2017-0143672 | Apparatus and method for defensing of code reuse attack | ELECTRONICS AND TELECOMMUNICATIONS RESEARCH INSTITUTE |
| 2 | KR | B1 | G-06F-021/57 | 2028251 | 2017-0135172 | Code reuse weakness scanning diagnostic apparatus and method | SEOUL WOMEN'S UNIVERSITY INDUS |
| 3 | US | B2 | G-06F-012/00 | 10628589 | 15-412672 | Methods, system, and computer readable media for preventing code reuse attacks | THE UNIVERSITY OF NORTH CALIFORNIA AT CHAPEL HILL |
| 4 | KR | B1 | G-06F-021/54 | 1851330 | 2016-0131061 | Apparatus and method for detecting code reuse attack | SNU R&DB FOUNDATION |
| 5 | CN | B | G-06F-021/62 | 106022166 | 2016-10388347 | A code multiplexing attack defense system and method | UNIV NORTHEASTERN |
| 6 | CN | B | G-06F-021/56 | 106096407 | 2016-10375304 | Code reuse attack defense method | UNIV HUAZHONG SCIENCE TECH |
| 7 | JP | B2 | G-06F-021/55 | 6207392 | 2013-273322 | Abnormality detecting apparatus, abnormality detecting method, and abnormality detecting program | NTT COMMUNICATIONS CO |
| 8 | KR | B1 | B66B-005/00 | 2145144 | 2020-0024302 | Intelligent prevention system for prevention of elevator accident based on abnormality detection using ai machine learning | AI NET CO LTD |
| 9 | KR | B1 | A23K-010/20 | 2137226 | 2020-0002491 | Manufacturing method of brewed food for companion animals without rice or wheat | IBR CO LTD |

FIG. 7

| No. | Country Code | Document Type Code | Publication /Registration Number | Publication /Registration Date | Date of Expiration of Patent | Name of the Invention | Applicant | Main IPC |
|---|---|---|---|---|---|---|---|---|
| #No# | #country# | #document type# | #patent number# | #patent date# | #expiration date# | #name# | #applicant# | #MIPC# |

REPLICATE BY (N-1) NUMBER 810-1 / 810

| No. | Country Code | Document Type Code | Main IPC | Publication/Registration Number | Application Number | Name of the Invention | Applicant |
|---|---|---|---|---|---|---|---|
| 1 | KR | B1 | G06F-021/56 | KR 1989580 | 2017-0143672 | Apparatus and method for defensing of code reuse attack | ELECTRONICS AND TELECOMMUNICATIONS RESEARCH INSTITUTE |
| 2 | KR | B1 | G06F-021/57 | KR 2028251 B1 | 2017-0135172 | Code reuse weakness scanning diagnostic apparatus and method | SEOUL WOMEN'S UNIVERSITY INDUS |
| 3 | US | B2 | G06F -012/00 | US 10628589 B2 | 15-412672 | Methods, systems, and computer readable media for preventing code reuse attacks | THE UNIVERSITY OF NORTH CAROLINA AT CHAPEL HILL THE RESEARCH FOUNDATION FOR THE STATE UNIVERSITY OF NEW YORK |
| 4 | KR | B1 | G05F-021/54 | KR 1851330 B1 | 2016-0131061 | Apparatus and method for detecting code reuse attack | SNU R&DB FOUNDATION |
| 5 | CN | B | G06F -021/62 | CN 106022166 B | 2016-10388347 | A code multiplexing attack defense system and method | UNIV NORTHEASTE RN | ns
METHOD FOR AUTOMATICALLY CREATING USER-CUSTOMIZED DOCUMENT, AND DEVICE AND SERVER FOR SAME

CROSS REFERENCE TO RELATED APPLICATIONS

This application is a National Stage of International Application No. PCT/KR2020/011897 filed Sep. 3, 2019, claiming priority based on Korean Patent Application No. 10-2019-0109549 filed Sep. 4, 2019, the entire disclosures of which are incorporated herein by reference.

BACKGROUND OF THE DISCLOSURE

Field of the Disclosure

The present disclosure relates to a method for automatically creating a user-customized document, and an apparatus and a server for the same.

Related Art

Conventionally, an automatic document writer/editor for automatically creating a document for a large amount of data has been developed and distributed on the market. However, the conventional automatic document writer/editor provides a basic template, and is capable of automatically creating only a document in a uniform format set in this basic template so that a user cannot create a document in a desired format. Given that each company/service requires a different type of document to write/report, the advantages of the "automatic" document writer/editor have been greatly reduced because a user needs to write/edit the document again.

SUMMARY

As described above, an automatic document writer/editor provided in a related art is capable of automatically creating a document only in a predefined uniform template form, so there is a limit to automatically creating a document in a format desired by the user.

In an aspect, there is provided method for automatically creating a user-customized document, and the method includes: receiving an automatic document creation target from a user, wherein the automatic document creation object comprises a plurality of data items and a plurality of tags matching the plurality of data items is defined; receiving, from the user, a template file in which a format of the user-customized document is set, wherein the template file comprises at least one tag; and generating the user-customized document by replacing each tag in the template file with a data item matching a corresponding tag in the automatic document creation target.

According to an embodiment of the present disclosure, since a user can automatically create a document in a desired format, it is possible to reduce the time, effort, cost, and the like of the user inputting the document creating server.

In addition, according to an embodiment of the present disclosure, it is possible to perform a document task on a huge amount of data more easily and simply.

BRIEF DESCRIPTION OF THE DRAWINGS

FIG. 2 illustrates a tag search UI according to an embodiment of the present disclosure.

FIG. 3 illustrates a template file according to a first embodiment of the present disclosure.

FIG. 4 illustrates a user-customized document generated according to an embodiment of the present disclosure based on the template file of FIG. 3.

FIG. 5 illustrates inputting a data item to replace a tag according to one embodiment of the invention.

FIG. 6 illustrates a template UI according to an embodiment of the present disclosure.

FIG. 7 illustrates a plurality of automatic document creation targets according to an embodiment of the present disclosure.

FIG. 8 illustrates a template file according to a second embodiment of the present disclosure.

FIG. 9 illustrates a user-customized document generated according to an embodiment of the present disclosure based on the template file of FIG. 8.

DESCRIPTION OF EXEMPLARY EMBODIMENTS

Figure 1:
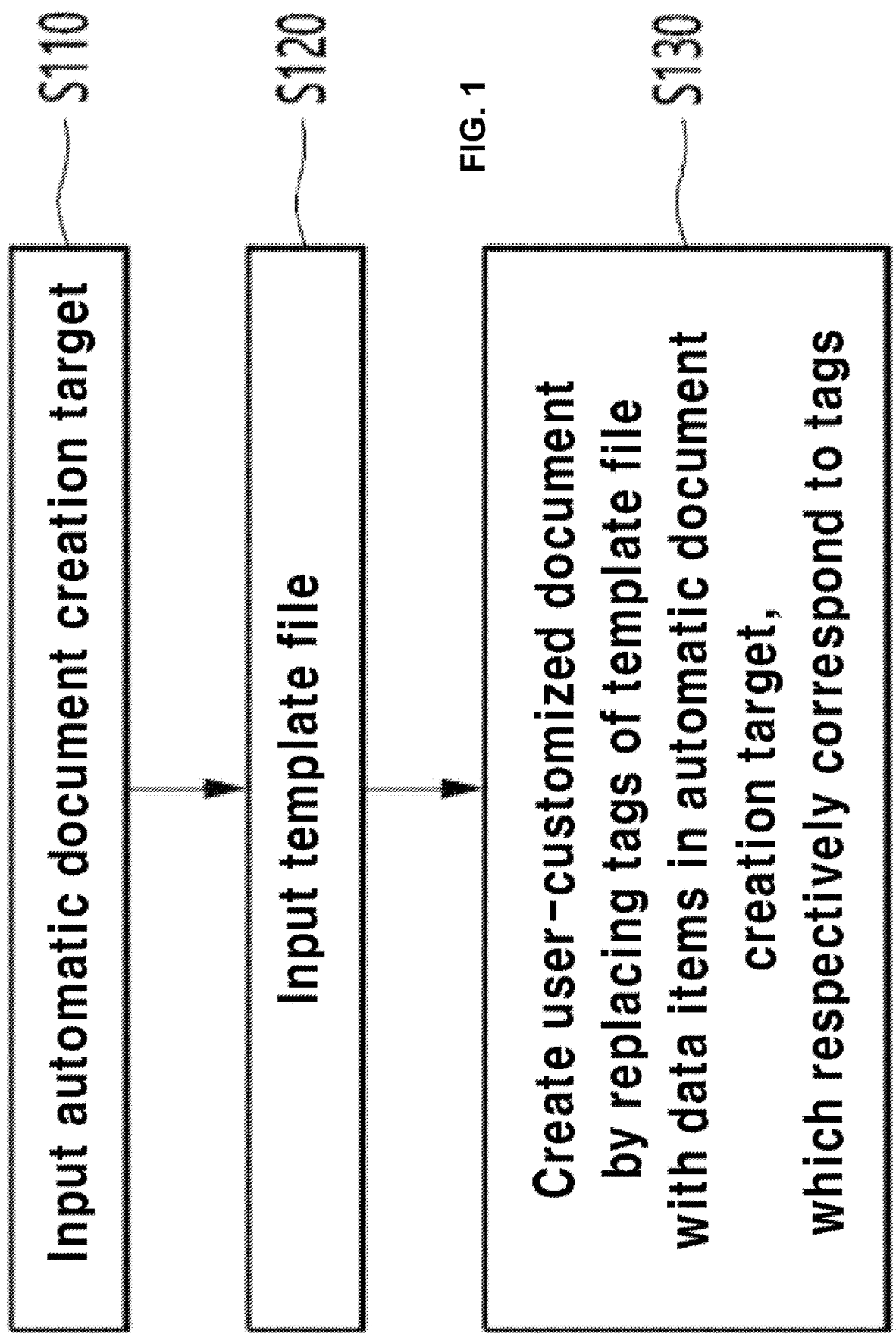
FIG. 1 is a flow chart of a method for automatically creating a user-customized document according to an embodiment of the present disclosure.

The present disclosure can be modified and changed in various ways and can be embodied in various forms, and thus, the present disclosure will now be described in detail with reference to the accompanying drawings, in which exemplary embodiments of the invention are illustrated. However, it should be noted that the present disclosure is not limited to the exemplary embodiments, but all modifications, equivalents, or substitutes within the spirit and scope of the present disclosure will be construed as being included in the present disclosure.

It will be understood that, although the terms "first", "second", "A", "B", and the like may be used herein in explaining various elements of the invention, such elements should not be limited by these terms, but are only used to distinguish one element from another. For example, a first element could be termed a second element, and similarly, a second element could be termed a first element, without departing from the scope of the present disclosure. The term "and/or" includes any and all combinations of one or more of the associated listed items. For example, "A and/or B" may be interpreted as "at least one of A or B." Also, "/" may be interpreted as "and" or "or".

As used herein, the singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before describing the drawings in detail, it should be noted that the distinction of elements is for distinguishing the main function of each element. That is, two or more elements to be described below can be joined as one element, or an element can be functionally divided into two or more elements. In addition, each of the elements to be described below may additionally perform some or all functions among functions which other elements take charge of in addition to the main function which each element takes charge of and some functions among the main functions which the respective elements take charge of may be exclusively charged and performed by other elements.

In addition, in performing a method or an operational method, each process constituting the method may be performed in an order different from a specified order as long as a specific order is not explicitly and contextually specified. That is, each process may be performed in the same order as the specified order, performed substantially simultaneously, or performed in reverse order.

The present disclosure relates to a method for automatically creating a user-customized document, and an apparatus and a server for implementing/controlling the same, and the execution subject of the embodiments described below may correspond to an apparatus or a server for automatically creating a user-customized document. In particular, the server may correspond to a web server providing a user-customized automatic document creating service via a web or an application server providing an automatic user-customized document creating service using an application. The apparatus or server for automatically creating a user-customized document may be abbreviated as "document creating apparatus" or "document creating server", respectively, and for convenience of description, the execution subject of an embodiment will be described below with reference to the "document creating server", but the present disclosure is not limited thereto.

An object of the present disclosure is to create a user-customized document by receiving a template file in a desired format from a user and inputting a data item of an automatic document creation target into the file. To this end, basically, the present disclosure has adopted the concept of "tag." Each tag is predefined to match a different data item, and the user may insert a tag corresponding to/matching a data item desired to be inserted into a template file of a format desired to be created and transmit the tag to the document creating server. In this case, the document creating server may recognize the tag in the template file, and create a user-customized document by replacing recognized tags with data items matching/corresponding to the respective tags while maintaining the template form provided by the user.

FIG. 1 is a flow chart of a method for automatically creating a user-customized document according to one embodiment of the present disclosure.

Referring to FIG. 1, a document creating server may first receive an automatic document creation target from a user in operation S110. In this case, the received automatic document creation target may correspond to any of various documents, records, files and the like that can be classified into various types of data items (or types/categories). For example, the automatic document creation target may correspond to a patent document, and in this case, a plurality of data items may correspond to bibliographic data/information on the patent document. The bibliographic data/information may include, for example, at least one of number information given for the patent document, bibliographic information of the patent document, technical information included in the patent document, administration information of the patent document, patent document information related to the patent document, applicant information of the patent document, analysis information of the patent document, and inventor information of the patent document. More specifically, the plurality of data items may correspond to, for example, a number, a name of the invention, a country, a document type, a main International Patent Classification (IPC), a legal status, a similarity degree, a class, a technical theme, a publication number, a registration number, a patent number, a publication date, a registration date, a registration publication date, an application number, a filing date, a priority number, a priority date, an expiration date of patent, an applicant, an applicant's nationality, a patent valuation grade, a right grade, a technology grade, a patent family, a citation, a cited document, a claim depth, the number of claim words, a claim relationship, whether a litigation is involved, and a type of litigation.

A plurality of tags matching/corresponding to the plurality of data items may be defined. A tag corresponds to a kind of an instruction that is replaced by a data item matching/corresponding to the tag, as described above. The tag may be of a combination of at least one special symbol and a data item designation that are recognizable as a text so as to be recognized by the document creating server. In particular, a data item designation included in a tag may be defined to include a character that is at least partially identical to a name of a data item that matches/corresponds to the corresponding tag. For example, a tag that matches/corresponds to the "name of the invention" data item may be defined as "#name #."

Since the document creating server recognizes the tag as a kind of instruction, an instruction for a data item replacement scheme may be separately defined and included in the tag. For example, a tag for instructing a limit range for at least one of the number of words and the number of lines in a data item may be defined as "#data item designation": limited number of words (x): limited number of lines (y)#" (e.g., #abstract:5:200, in which case the #abstract# tag is replaced by an abstract data item of 5 lines or less, 200 words or less). In this case, the document creating server replaces the tag with a data item matching/corresponding thereto, in which the number of words of the data item to be replaced is limited to x and the number of lines thereof is limited to y, respectively. Other characters that are not included in the user-customized document due to the limitation of the number of characters and the numbers of lines can be separately inserted into the user-Customized document through the memo function. As another example, when a detail item exists in a data item, a tag specifying a specific detail item in the data item may be defined as: '#data item designation; detail item; instruction" (e.g., #drawing: FIG. 5, where #drawing# tag is substituted by FIG. 5). To put it briefly, it may be understood that a tag largely includes a data item designation and an instruction regarding a data item replacement scheme. Thus, the document creating server first recognizes a data item to be replaced by the data item designating instruction in the tag, and determines in what way to replace the recognized data items by the instruction regarding the data item replacement scheme so as to generate a user-customized document.

Next, the document creating server may receive, from the user, a template file in which a format of the user-customized document is set, where the template file may include at least one tag, in operation S120. The user may generate in advance a template file in a desired form/format desired and create/insert a tag, which matches/corresponds to the data item to be inserted, into the template file at a desired location in a desired format. The document creating server may provide a template User Interface (UI)/function to allow a user to enter/upload a template file created by the user, and the user may input/update the template file through the template UI/function. Such a template UI/function may further provide various functions related to the template file, such as editing and previewing, as well as inputting/uploading of the template file, and this will be described in detail below with reference to FIG. 6.

Next, the document creating server may create a user-customized document by replacing tags in the template file with data items matching the tags in the automatic document creation target in operation S130. For example, when a tag of "#name#" is included in a template file input/uploaded by a user, the document creating server may recognize the tag as a tag, and input the "name of the invention" data item corresponding to the tag by replacing the "#name#" data item. If the automatic document creation target is the patent document of KR2028251B1, "#name#" is replaced by "code reuse weakness scanning diagnosis apparatus and method" which is the name of the present disclosure. Further, as will be described in more detail below, the position of each tag in the template file and/or the formatting/format applied to each tag applies equally to a data item that replaces a corresponding tag.

Thus, a user-customized document may be automatically generated in such a manner that only a data item of a target for document creation is inserted into a file format desired by the user, so that the user's convenience in creating the document is greatly increased.

Each step of the present flowchart may be described as an operation performed by a constituent element of a document creating server (or apparatus). For example, a first step may be interpreted as a step performed by the automatic document creation target inputting unit, a second step is interpreted as a step performed by a template file inputting unit, and the last step is interpreted as a step performed by a user-customized document creating unit. That is, elements of the document creating server may be divided into functional elements, and the elements may be implemented as at least one hardware/software element for performing each function, for example, at least an element of the block diagram of FIG. 10.

FIG. 2 illustrates a tag search UI according to an embodiment of the present disclosure.

In order for a user to create a template file by utilizing a tag, it is necessary to provide the user with information on predefined tags and data items matching/corresponding to the predefined tags. Accordingly, a document creating server of the present disclosure may provide a tag search UI 210 for providing information on the tag and the data item matching/corresponding to the tag.

Referring to FIG. 2, the tag search UI 210 may basically provide information on tag names 210-3 that match/correspond to data items 210-2. Further, the tag search UI may also provide a search function 210-1 to search for a data item or tag, so that a user can easily find a desired data item or tag.

A usage type 210-4 of each data item 210-2 or tag 210-3 may be set according to an embodiment. For example, the "common" usage type indicates a type commonly available for all users, and the "unique" usage type indicates a type available only for a specific user. A case where data items and tags are set and edited directly by the user corresponds to "unique" type in the latter case. In addition, "unique" may be used to indicate an item characteristically applied to each type of user-customized document. For example, when the type of user-customized document is a "prior art search report", the "unique" item may correspond to "relationship with the present technology", "report title", etc.

For convenience of description, assuming that the data items 210-2 and the tags 210-3 are defined to match/correspond to each other, as shown in FIG. 2, each embodiment is described below. It should be understood, however, that data items 210-2 and the tags 210-3 may be defined/set by a user or server administrator in any form of various embodiments.

FIG. 3 illustrates a template file according to a first embodiment of the present disclosure. FIG. 4 illustrates a user-customized document generated according to an embodiment of the present disclosure based on the template file of FIG. 3.

A user may generate and create a template file 310 by creating a file in a desired format and then inserting tags at positions where data item respectively corresponding to the tags are desired to be inserted, as shown in FIG. 3.

The document creating server may receive an input of the template file 310 created by the user, and may generate a user-customized document 410 by recognizing the tags in the template files 310 and replacing the respective tags with the data item matching/corresponding thereto (particularly, data items in an automatic document creation target) in the template file 310, as shown in FIG. 4.

FIG. 5 illustrates inputting a data item to replace a tag according to one embodiment of the invention.

As described above, in order to allow a user to completely create a document of a desired form/format, the present disclosure provides a function to apply all formatting applied by the user to a tag to a data item that is to replace the corresponding tag. Here, the formatting is any format/form/format that can be applied to a text by using a function provided by document creating software (particularly, the document creating software which creates the template file). For example, the form may include at least one of font color, font, font size, bold, underline, italics, strikethrough, highlight, line height, style, indentation, and text alignment.

For example, as shown in FIG. 5, formatting with a first font and a font size 10 and formatting with a second front and a font size 15 may be respectively applied to a "#no#" tag 520-1 and a "name" tag 530-1 in the template file 510-1. In this case, a user-customized document 510-2 may be generated as "1" 520-2 corresponding to the number of data items is inserted into a user-customized document with the formatting with the first font and the font size 10 applied thereto and "exhaust gas after-treatment device for vehicle" 530-2 is inserted into the template file 510-1 with the formatting having the second font and the font size 15 applied thereto.

This may be understood that the document creating server "copy" each data item and "select and paste" a tag matching/corresponding thereto. That is, while a format applied to a tag remains unchanged, only a text of a data item is copied and substituted for the tag.

It has been impossible to automatically generate a document by using all the format/functions provided by various document writing software such as MS OFFICE, Hangul office, etc. due to functional limitations of an editor, such as existing web mail. According to the present disclosure, however, all formatting/forms/formats (including tags) of an uploaded template file are reflected in a user-customized document (it is because only tags are replaced by data items in a template file to generate a user-customized document), so that a document can be automatically generated by using/applying/reflecting all the formatting/forms/formats provided by all the document writing software as desired by the user without any restriction to the type of the document writing software. In particular, since only tags in a template file entered/uploaded by the user are text-replaced by data items (that is, the formatting is maintained) to generate a user-customized document, other parts (e.g., any target that can be entered such as tables, graphs, pictures, text, etc.), except for the tags, included in the template file remains in the same formatting/form/format in the user-customized document.

Figure 6:
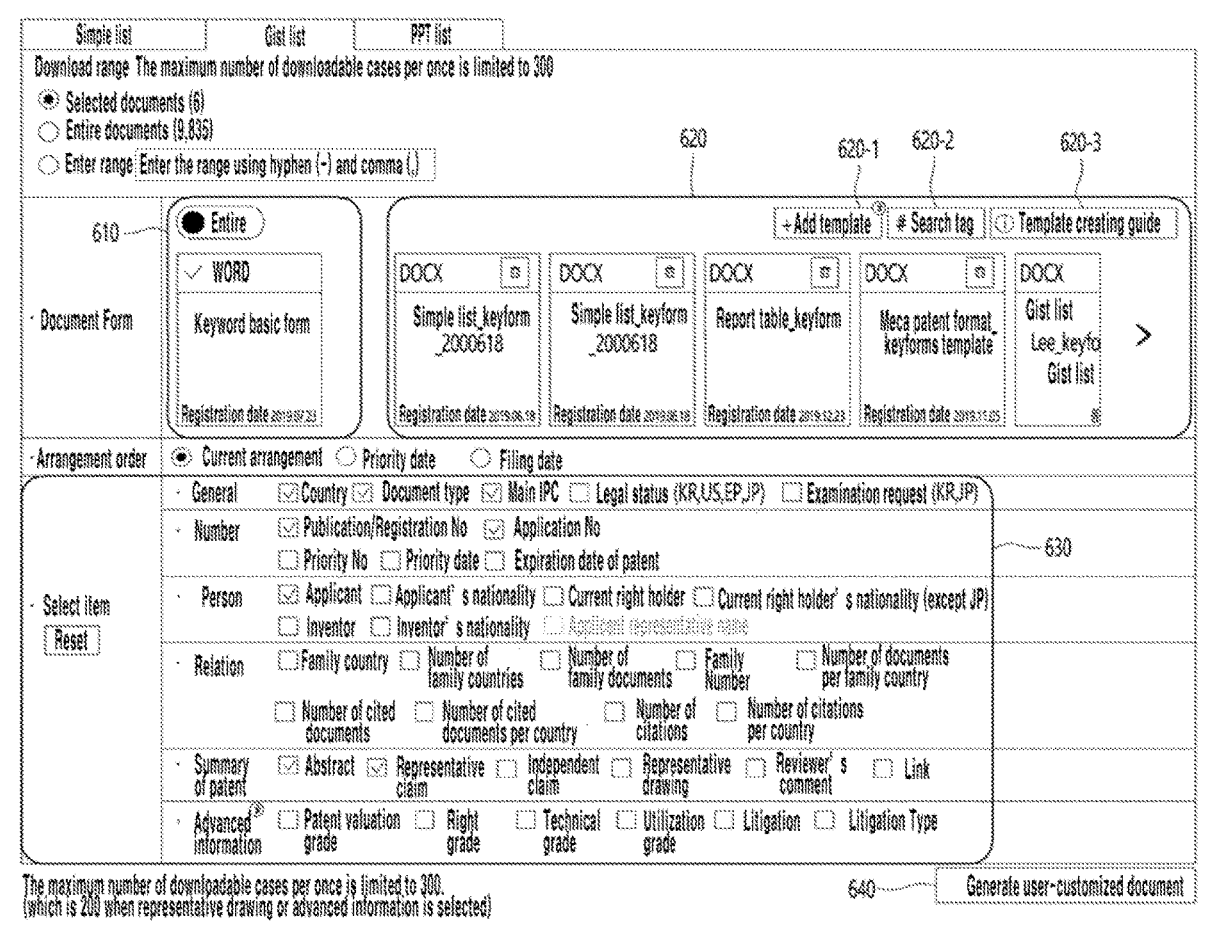

FIG. 6 illustrates a template UI according to an embodiment of the present disclosure.

The document creating server may provide a template UI/function 620 for allowing a user to enter/upload a template file created by a user, and the user may enter/update the template file using the template UI/function 620. Such a template UI/function 620 may further provide various functions associated with the template file, such as editing, deleting, and previewing, as well as input/uploading the template file. The template UI/function 620 may also provide meta information (e.g., a file name, a file extension, an input/upload/modification/deletion date, etc.) on the template file that the user entered/uploaded.

Referring to FIG. 6, the template UI/function 620 may provide a template addition icon 620-1 that provides a function for a user to upload/enter/add a template file. The user may input/upload a plurality of template files using the template addition icon 620-1, in which case the template UI/function 620 provides a template file selection function so that the user can select a template file for generating a user-customized file among the plurality of the template files.

And/or, the template UI/function 620 may provide a tag search icon 620-2 that provides matching/corresponding information on predefined data items and tags. Such a tag search icon 620-2 may correspond to an execution icon 620-1 of the tag search UI described above with reference to FIG. 2. In addition, template UI/function 620 may provide a template making guide icon 620-3 that provides information/functions to guide the user to more accurately and easily generate a template file as intended.

And/or, the template UI/function 620 may recognize tags in the template file uploaded/input by the user, and provide the user with information in a check list form regarding data items currently included in the template file. Assuming that the tags in FIG. 2 are defined as entire tags. In this case, if only #NO#, #Name #, #Country#, #Document type#, #MIPC#, and #Status# are included in a template file uploaded/inputted by a user, the template UI/function 620 may check the checkboxes for data items corresponding to the tags, i.e. the number, the name of the invention, the country, the document type, the main IPC, and the legal status, while not checking the check boxes for data items not included in the template file, i.e. the similarity, My class, the technology theme, the publication number, and the registration number. This allows the user to easily feature out whether the tags are all included without missing in the template file uploaded/input by the user.

And/or, the template UI/function 620 may provide a function to create and provide a sample of a user-customized document file. More specifically, when the user uploads/input a template file through the template UI/function 620 and requests a sample for the template file, the document creating server may create a sample of a user-customized document file by replacing tags in the corresponding template file with preset sample data items of an automatic sample document creating target, and may provide the sample to the user. By checking the sample of the user-customized document file, the user may check whether a document has been written well as intended, and may modify the template file if necessary.

In addition to the template UI/function 620, the document creating server may provide basic document creating server may provide a basic document creating UI/function so that a document can be generated even without the user creating a separate template file. This basic document creating UI/function provides/includes a predefined basic template file providing function 610 and a data item check list function 630 by which a particular data item to be included in a user-customized document can be selected. In this case, the document creating server generates a user-customized document based on the user's input of selection. More specifically, when the user selects the basic template file 610 and selects a specific data item to be inserted into the user-customized document using the data item check list function 630, the document creating server may generate a user-customized document by replacing each tag in the basic templates file 610 with a specific data item that matches a corresponding tag in the automatic document creation target. In this case, if there is a tag included in the basic template file 610 but not selected by the user, the document creating server may generate a user-customized document by deleting/excluding the tag.

The template UI/function 620 and the basic document creating UI/function each may provide an icon 640 for execute generation of a user-customized document, and the user may instruct generating a user-customized document by clicking/selecting/touching the icon 640.

It should be appreciated that the template UI/function 620 and the basic document creating UI/function may be provided in combination in a single web page as shown in this figure, but not limited thereto, and may be provided in separate web pages as separate UIs/functions, or only one of the both may optionally be provided. When the template UI/function 620 and the basic document creating UI/function are provided together in one web page, the user may select one of the basic template file and the template file directly input/uploaded by the user to generate a user-customized document.

FIG. 7 illustrates a plurality of automatic document creation targets according to an embodiment of the present disclosure.

In the present specification, as described above, an automatic document creation target may correspond to various documents, files and the like that can be classified into various types of data items (or types/categories). As a representative example, there is a patent document. In addition, examples of automatic document creation target include thesis, student grade and course records, patient surgery records, patient prescription records, personal information on individuals in terms of country/city/province, employee contact information, and the like.

When the automatic document creation target is a patent document, the method for automatically creating a user-customized document, proposed in the present specification, may be advantageously applied/used in a patent search system. In this case, the document creating server may be interpreted as a web server that provides a patent search function and service, and the user may search patent documents using the provided patent search function and service, and input/specify at least a part of the found patent documents as an automatic document creation target. The document creating server may provide patent document search results 710 according to a patent search input by the user, and may recognize at least one patent document selected by the user's input of selection from among the search results 710 as the automatic document creation target of the present disclosure. That is, the document creating server recognizes the user's input of selection of at least one patent document as inputting/specifying an automatic document creation target.

Thus, when the automatic document creation target is input/specified according to the user's input, the document creating server generates a user-customized document based on a template file, as described above.

In a case where there is a plurality (n number) of automatic document creation targets, it is reasonable to consider that the user wishes every automatic document creation target to be created/included in a user-customized document in a format written in the template file. This is because the formatting of the template file the number of automatic document creation targets is very troublesome from the user's point of view.

Accordingly, the present specification proposes a method for easily creating a user-customized document even with respect to a plurality of automatic document creation targets.

First, the document creating server may recognize a format defined in a template file input by the user as a basic format.

Next, the document creating server may replicate the recognized basic format by the number n−1 of automatic document creation targets, and may correspond the automatic document creation targets to the basic formats, respectively. For example, in a case where the document of FIG. 3 is input as a template file and automatic document creation targets are patent documents No. 1 to No. 5 in FIG. 7, the document creating server may recognize the table of FIG. 3 as a basic format and replicate four (4=5−1) basic formats. As a result, there are a total of five basic formats (i.e., five tables) in the template file. The document creating server may correspond five basic formats to five patent documents. A method for association may set variously, and, for example, an automatic document creation target may correspond to a basic format having the same arrangement order as that of the automatic document creation target.

Next, the document creating server may generate a result for each basic format by replacing each tag in each basic format with a data item in the automatic document creation target corresponding to a corresponding basic format. Of course, the tag to be replaced herein is replaced only by a data item that is defined to match/correspond to the tag in advance. Based on the above example, the tags included in a first basic format may be replaced by data items corresponding to/matching the same in a first patent document, thereby generating a result. The same is performed for the rest of the basic formats and patent documents to generate a result, and as a result, a total of five results are generated.

Finally, the document creating server generates a user-customized document including all results for the respective basic formats. In the case of the above example, a user-customized document including five tables replaced by data items of five patent documents is generated.

FIG. 8 illustrates a template file according to a second embodiment of the present disclosure. FIG. 9 illustrates a user-customized document generated according to an embodiment of the present disclosure based on the template file of FIG. 8.

A user may wish to create a document 910 by listing up a vast amount of data according to a document type, as shown in FIG. 9, or may create a document 410 by summarizing and organizing the data in a table format as shown in FIG. 4 above. Reflecting the user's intention, the present disclosure proposes an embodiment in which a selection input regarding a document type from a user is received and generates a user-customized document based thereon.

The document type may be defined in various ways, and the present disclosure mainly proposes three types. A first type is a document type created in such a way that data is summarized and organized based on a table format, and may correspond to a prior art search report, a claim chart, or the like. A second type is a document type created in such a way that data is listed up, and may correspond to, for example, a prior art list, a patent document list, or the like. A third type is a document type created based on PowerPoint (PPT), and like, and may correspond to a prior art list, a patent document list, a prior art search report, a claim chart, or the like as do the first and second types. Therefore, when the user preferentially selects a document type desired to generate and then uploads the template file, the document creating server may replicate a basic format of the template files based on the document type to generate a user-customized document.

More specifically, when the first type is selected, the user intends to organize and summarize the data into a table format, so the document creating server may recognize a table in the template file as a basic format as in the embodiments of FIGS. 3 and 4, and replicate the table by the n−1 number of automatic document creation targets to generate a user-customized document. Therefore, when the first type is selected, it is assumed that the template file uploaded/input/selected by the user basically includes a tag-containing table. In a case where there is no tag-containing table in the uploaded/input/selected template file even if the first type was selected, the web server may guide the user to re-upload/re-input/reselect the template file including the table.

When the second type is selected, the user intends to create a document in a format in which the data is listed up, so the document creating server may recognize a first row 810-1 or a first column containing tags in the template file (or the last row/column of the table) in the basic format, and replicate only the first row 810-1 or the first column to generate a user-customized document. For example, when the patent documents No. 1 to No. 5 in FIG. 7 are set as automatic document creation targets and the template file 810 in FIG. 8 is selected, the document creating server may recognize a second row 810-1 including the tags in FIG. 8 as a basic format and replicate four (4=5−1) copies (which are not replication of the table itself as in the first type). Then, the document creating server causes a basic format to correspond to/match an automatic document creation target and then replaces a tag with a data item to generate a user-customized document 910, as described above. That is, unlike the above-described embodiment in which FIG. 3 is the template file 810 (i.e., a case where tags are included in a plurality of rows or columns), the entire format in the template file 810 is not replicated, but only the row 810-1 or column in which the tags are included are replicated and inserted into the table. This may be advantageously used when the user wishes to simply list up data items in the form of a table. Therefore, when the second type is selected, it is assumed that the template file uploaded/input/selected by the user basically includes a table in which all tags are written in one row or one column (or a table including tags in the last row or column). In a case where there is no table of such a format in the template file uploaded/input/selected even if the second type was selected, the web server may guide the user to re-upload/re-input/reselect a template file with the table in the format included therein.

When the third type is selected, the user intends to organize and summarize the data into a PPT format, so the document creating server may recognize a slide including the tags in the template file as a basic format, and then replicate the slide by the n−1 number of automatic document creation targets to generate a user-customized document.

Therefore, when the third type is selected, it is assumed that the template file uploaded/input/selected by the user basically includes a slide including tags. If there is no slide with a tag included in the template file uploaded/input/selected even if the third type is selected, the web server may guide the user to re-upload/re-input/reselect a template file (particularly, a PPT file) with the slide of the above format included therein.

Since each slide and each automatic document creation target correspond to each other due to documental characteristics of the third type, it is preferable that the content of each slide does not pass to a next slide. That is, due to documental characteristics of the third type, a quantity of each automatic document creation target should be limited to a quantity of one slide. To this end, the user may set/limit the amount of each slide using a predefined instruction (e.g., "#data item designating instruction: limited number of letters (x):limited number of columns (y)#"), or when the web server itself generates a user-customized document, the user may insert an over-quantity into each slide separately using a memo function.

In addition, due to the documental characteristics thereof, the third type has advantages that the insertion/editing/inputting of a drawing/picture/image/moving picture/photograph is free compared to other documents, and the documental characteristics of the third type allows the user to insert various drawings/pictures/images/moving pictures/photographs. Basically, the web server may provide a service for inserting a drawing/picture/image/moving picture/photograph into the background of each slide with respect to a third type of document. However, when the user wants to insert a figure directly at a desired position in a desired size/shape/format, the figure may be inserted at the desired position using a figure inserting function, and a tag corresponding to the drawing/picture/image/moving image/photograph data item may be included in the figure. In this case, the document creating server recognizes the tag and inserts the drawing/picture/image/moving picture/photograph into the figure, so that the drawing/picture/image/moving picture/photograph can be adjusted in size and shape according to a size and a shape of the figure and adjusted in position according to a position of the figure. Thus, the user is able to change the position, size and shape of the data item to be inserted, by changing the position, size and shape of the figure.

Further, according to the above-described embodiment, since the automatic creation of a document is possible while all of various functions of existing document creating server software are utilized and maintained, the present disclosure has an effect that the degree of freedom and utilization of document creation is very high.

It is to be understood that the functions specifically applied to each document type described above are not limited to the embodiments described above, and may be freely applied regardless of a document type according to settings of a user/administrator. It goes without saying that, for example, a memo inserting function according to the limited number of letters of the third type may also be applied to a document of the first or second type, or documents of a type newly defined by the user/administrator. As another example, a drawing/picture/image/moving picture/picture inserting function of the third type may, of course, also be applied to a document of the first or second type or a document of a type newly defined by the user/administrator.

In addition, although the documents types have been classified into three for convenience of description, the present disclosure is not limited thereto, and various types of documents may be newly defined by the user or the server administrator according to the purpose of a user-customized document method, and it is needless to say that an automatic document creating method may be provided for such documents based on the above-described embodiments.

For example, the user may create a fourth type of template document (e.g., a prior art search report) in a form in which the first and second types are combined (i.e., a document including both table and list forms) and upload/input the fourth type of template document into the document creating server, or may apply a selection input of the fourth type of document defined by an administrator. In this case, the document creating server may recognize a format in which a tag is included in the template document, and generate a user-customized document according to the embodiments described above. More specifically, the document creating server may recognize a document format (table) of the first type, including a tag in the template document, as a first basic format, and may recognize a document format (row/column) of the second type, including a tag in the template document, as a second basic format. As a result, the document creating server may repeat/replicate the first basic format by the number of data items and repeat/replicate the second basic format by the number of data items to generate a user-customized document.

That is, various types of basic formats may be included in one template file, and the document creating server obtains characteristics of each basic format and replicates/repeats each basic format by the number of data items according to each characteristic, so that a user-customized document more consistent with the user intent can be generated.

As described above, when a user-customized document is generated based on a template file including a plurality of basic formats of different types, an instruction for allowing the document creating server to recognize each basic format may be defined separately. For example, #table repeat# is to recognize a table as a basic format and instruct replication/repetition of the table by the number of data items, and #column repeat# or #row repeat# is to recognize a first column/first row as a basic format and replicate/repeat the column/row by the number of data items. The user may instruct the document creating server about a format of a user-customized document format by inserting/inputting the #table repeat# tag in the table in an attempt to replicate the table, while inserting/inputting the #column repeat# or the #row repeat# tag in the last row or column in the table in an attempt to replicate a row or a column.

As can be seen from the above-described embodiments, the present disclosure may be more advantageously used in a case where there is a huge amount of data, that is, a huge amount of automatic document creation targets. This is because as the amount of data increases, it is very cumbersome and difficult for the user to directly input the data accurately in a short time. In particular, in the case of various reports, documents, and the like relating to patent documents, the present disclosure may be more advantageously used because such reports, documents, and the like are mainly written to analyze/compare a large amount of patent documents that have been searched through a patent search service.

Figure 10:
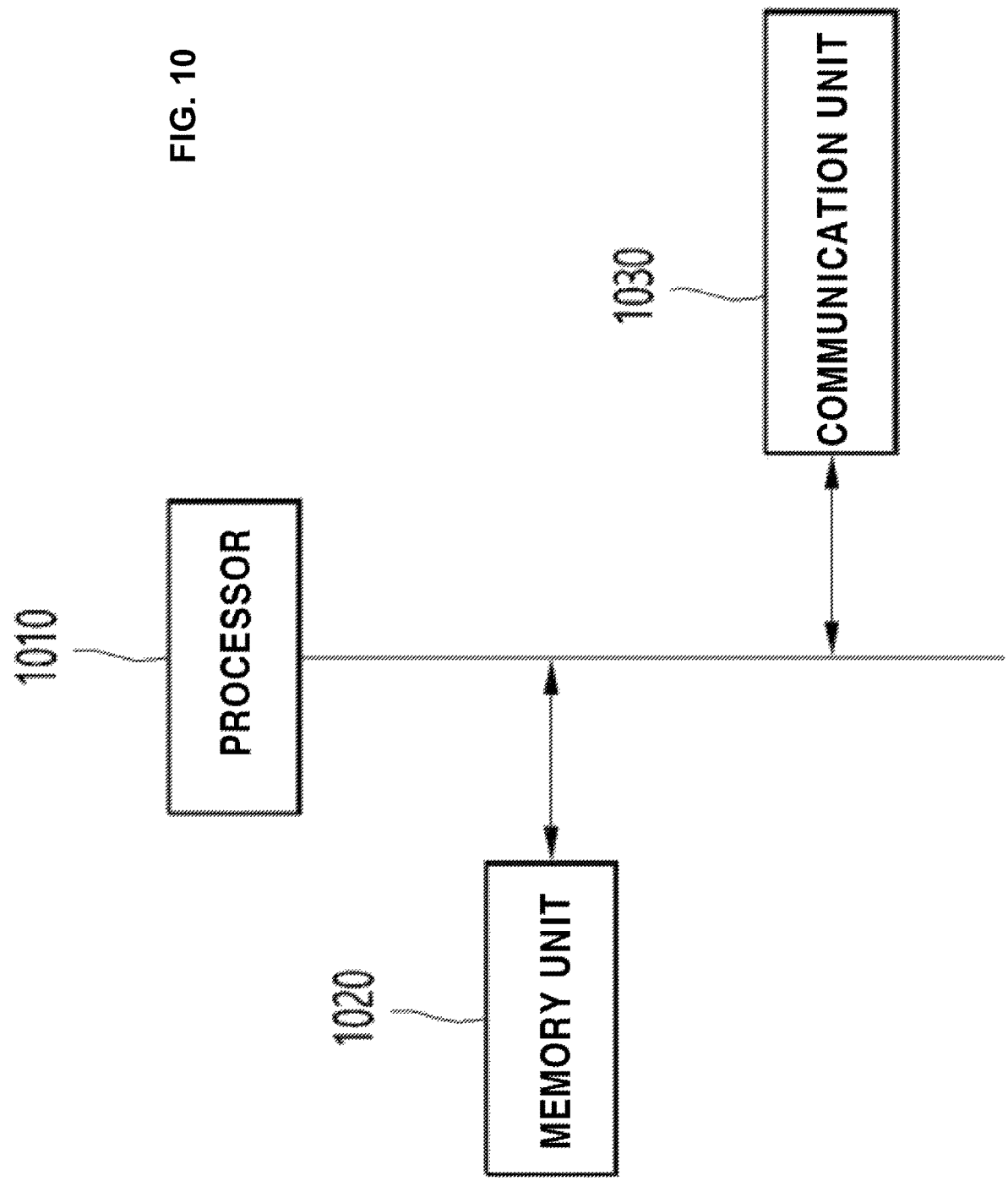
FIG. 10 is a block diagram of a document creating server according to an embodiment of the invention.

FIG. 10 is a block diagram of a document creating server according to an embodiment of the present disclosure.

Referring to FIG. 10, the document creating server may include a processor 1010, a memory unit 1020, and a communication unit 1030. Each element may be implemented using at least one hardware/software element.

The memory unit 1020 may store a variety of digital data such as video, audio, pictures, moving images, applications, files, etc. The memory unit 1020 represents any of various digital data storage spaces such as a flash memory, a hard disk drive (HDD), a solid state drive (SSD), etc.

The communication unit 1030 may perform communication with the outside of the device using various protocols to transmit/receive data. The communication unit 1030 may connect to an external network by wire or wirelessly to transmit/receive digital data.

The processor 1010 may execute various applications stored in the memory unit 1020 and process data. Further, the processor 1010 may control at least one unit to implement the embodiments described in the present specification. Accordingly, the processor 1010 may be described as being substituted with a document creating server. The processor 1010 may include at least one of a central processing unit (CPU), a micro processor unit (MPU), a micro controller unit (MCU), an application processor (AP), an application processor (AP), or any form of processor well known in the art.

The description of the present block diagram is equally applicable to the document creating apparatus.

In summary of the above-described embodiments, the present disclosure relates to a system and a method for automatically creating a user-customized document, and an apparatus and a server for the same, in which when a simple tag is input and uploaded into any of various document forms held by a user, a data item corresponding to the tag is filled in to automatically create a document. That is, a user inserts a predefined tag at a desired position in a document file of any of various file extension, such as MS Word, PPT, MS Excel, HWP, and the like, designates the tag in a font, a style, and the like desired by the user, and stores the tag as a template file. When the stored template file is uploaded to a system configured as a web or the like, the document creating server may check the tag of the file, generate a user-customized file by automatically input a data item specified at a corresponding tag position, and provide the user-customized file to the user.

In the template file, it is possible to insert various elements including company logos, header, and footer, all of the elements which remain in the user-customized document while only tags are replaced (or substituted) by data items in the style desired by the user, so that the user can generate a variety of data such as patent information into a file in the form of a large list or table or report without having to copy and paste the variety of data.

A system for generating a user template-customized report and a method for generating the same may be utilized in various forms, but preferably utilized in conjunction with a search DB such as patents. Specifically, even in a case where a patent document obtained as a result of patent search is selected and tens or hundreds of data items such as the name of the patent document, the applicant, the filing date, drawings, a patent family, and a citation are collectively attached in a report form desired by a user, the form desired by the user may be maintained and a desired style may be simply set only by inputting a tag, and thus, a vast amount of reports as if made directly by the user may be easily made.

A tag gives an attribute such as a single item, a list, a table, non-redundant, or the like which is input at certain positions in a document, so that the user can input data by determining whether the list, table, or the like is repetitive and data can be input while automatically maintaining the format which is the table, list, or the like.

Embodiments of the present disclosure may be implemented using various means, for example, hardware, firmware, software, or a combination thereof. In a hardware configuration, the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

Further, in a firmware or software configuration, the embodiments of the present disclosure may be implemented in the form of a module, a procedure, a function, etc. and recorded in a computer-readable recording medium through various computing devices. The recording medium may separately include program commands, data files, data structures, etc., or include a combination of them. The program commands recorded in the recording medium may be specially designed and configured for the present disclosure, or known and available to those of ordinary skill in the field of computer software. Examples of the recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program commands Examples of the program commands may include high-level language codes executable by a computer using an interpreter, etc. as well as machine language codes made by compilers. Such a hardware device may be configured to operate as one or more software modules for performing operation of the present disclosure, and vice versa.

In addition, the apparatus or terminal according to the present disclosure may be driven in accordance with a command to cause one or more processors to perform the functions and processes described above. For example, such commands may include interpretable commands such as script command, e.g., JavaScript or ECMAScript, executable code, or other commands stored in a computer-readable medium. Further, the apparatus according to the present disclosure may be implemented in a distributed form, such as Server Farm, over the network or may be implemented in a single computer device.

A computer program (also known as a program, software, software application, script, or code) can be written in any form of a programming language, which includes compiled or interpreted languages, or declarative or procedural languages, and it can be deployed in any form, including a stand-alone program or module, a component, a subroutine, or another unit suitable for use in a computing environment. A computer program may, but need not, correspond to a file in a file system. A program can be stored in a single file provided to the requested program, in multiple coordinated files (e.g., files that store one or more modules, sub-programs, or portions of code), or in a portion of a file that holds other programs or data (e.g., one or more scripts stored in a markup language document). A computer program can be deployed to be executed on one computer or on multiple computers that are located at one site or distributed across multiple sites and interconnected by a communication network.

For convenience of description, although the description has been made for each of the drawings, the embodiments of the respective drawings may be incorporated to achieve a new embodiment. Further, configurations and methods of the described embodiments may not be limitedly applied to the aforementioned present disclosure, but all or some of the respective embodiments may be selectively combined and configured so as to be variously modified.

Further, while the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

What is claimed is:

1. A method for automatically creating a user-customized document, performed by one or more servers, comprising:
   identifying an automatic document creation target selected or received from a user, wherein the automatic document creation target comprises a plurality of data items;
   identifying a template file inputted or uploaded by the user; and
   generating the user-customized document by replacing each tag in the template file with a data item in the automatic document creation target,
   wherein in a case where there is a plural number n of automatic document creation targets, the generating of the user-customized document comprises:
   recognizing a basic format included in the template file based on the tag related to repetition of the basic format;
   replicating the basic format by a number n−1 of automatic document creation targets according to the tag related to repetition of the basic format; and
   generating the user-customized document by replacing the tag included in each of the replicated basic format with a data item matching the tag,
   wherein the replicating the basic format comprising:
   when a table including the tag in the template file is recognized as the basic format, replicating the table by a number n−1 of automatic document creation targets,
   wherein the server guides the user to re-input or re-upload the template file including the tag, when there is no tag in the template file inputted or uploaded by the user,
   wherein the template file includes the tag for instructing a limit range for at least one of a number of words or a number of lines in the data item, wherein the tag is a combination (i) a data item designation of the data item and (ii) the number of words or the number of lines, and
   wherein the server replaces the tag with the data item corresponding to the number of words and the number of lines and inserts other characters that are not included in the user-customized document due to a limitation of the number of words or the number of lines into the user-customized document through a memo function, wherein the other characters is character related to over-quantity due to the number of words or the number of lines.

2. The method of claim 1, wherein the automatic document creation target corresponds to a patent document.

3. The method of claim 2, wherein the plurality of data items comprises
   at least one of the following: number information given to the patent document, bibliographic information on the patent document, technical information included in the patent document, administration information on the patent document, patent document information related to the patent document, applicant information on the patent document, analysis information on the patent document, and inventor information on the patent document.

4. The method of claim 2, wherein the automatic document creation target is at least one patent document in extracted from a patent document search result.

5. The method of claim 1, further comprising:
   providing the user with a UI that provides information on the plurality of tags defined to match the plurality of data items.

6. The method of claim 1, further comprising:
   providing the user with a UI that provides at least one of inputting, editing, and previewing of the template file.

7. The method of claim 1, wherein the generating of the user-customized document further comprises:
   recognizing formatting applied to each tag; and
   applying the formatting, which is applied to each tag, to a data item that is to replace a corresponding tag.

8. The method of claim 7, wherein the formatting corresponds to formatting that is applicable to a text using a function provided by document creating software which creates the template file.

9. The method of claim 8, wherein the formatting comprises at least one of font color, font, font size, bold, underline, italics, strikethrough, highlight, line height, style, indentation, and text alignment.

10. The method of claim 1, further comprising:
    receiving the user's input of selection of a type of the user-customized document.

11. The method of claim 1, wherein the tag is composed of at least one special symbol, which is recognizable as a text, and a data item designation.

12. The method of claim 11, wherein the data item designation included in the tag is defined to comprise a character at least partially identical to a name of a data item matching the corresponding tag.

13. The method of claim 11,
    wherein in a case where an instruction for setting a manner of replacement of the data item matching the tag is defined and the tag further comprises the instruction, and
    wherein the data item to replace the corresponding tag replaces the tag in a manner set according to an instruction included in the tag.

14. A method for automatically creating a user-customized document, performed by one or more servers, comprising:
    identifying an automatic document creation target selected or received from a user, wherein the automatic document creation target comprises a plurality of data items;
    identifying a template file inputted or uploaded by the user;
    replicating a basic format included in the template file based on the tag related to repetition of the basic format; and
    generating the user-customized document by replacing the tag included in each of the replicated basic format with a data item matching the tag,
    wherein the replicating the basic format comprising:
    when a table including the tag in the template file is recognized as the basic format, replicating the table by a number n−1 of automatic document creation targets,
    wherein the server guides the user to re-input or re-upload the template file including the tag, when there is no tag in the template file inputted or uploaded by the user, wherein the template file includes the tag for instructing a limit range for at least one of a number of words or a number of lines in the data item, wherein the tag is a combination (i) a data item designation of the data item and (ii) the number of words or the number of lines, and wherein the server replaces the tag with the data item corresponding to the number of words and the number of lines and inserts other characters that are not included in the user-customized document due to a limitation of the number of words or the number of lines into the user-customized document through a memo function, wherein the other characters is character related to over-quantity due to the number of words or the number of lines.

* * * * *